Dec. 29, 1970   H. W. STRAAT   3,551,021
HIGH-POWER MAGNIFIER
Filed Sept. 19, 1968
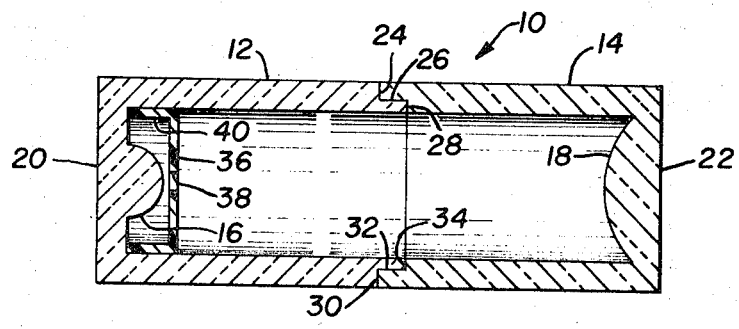
FIG. 1
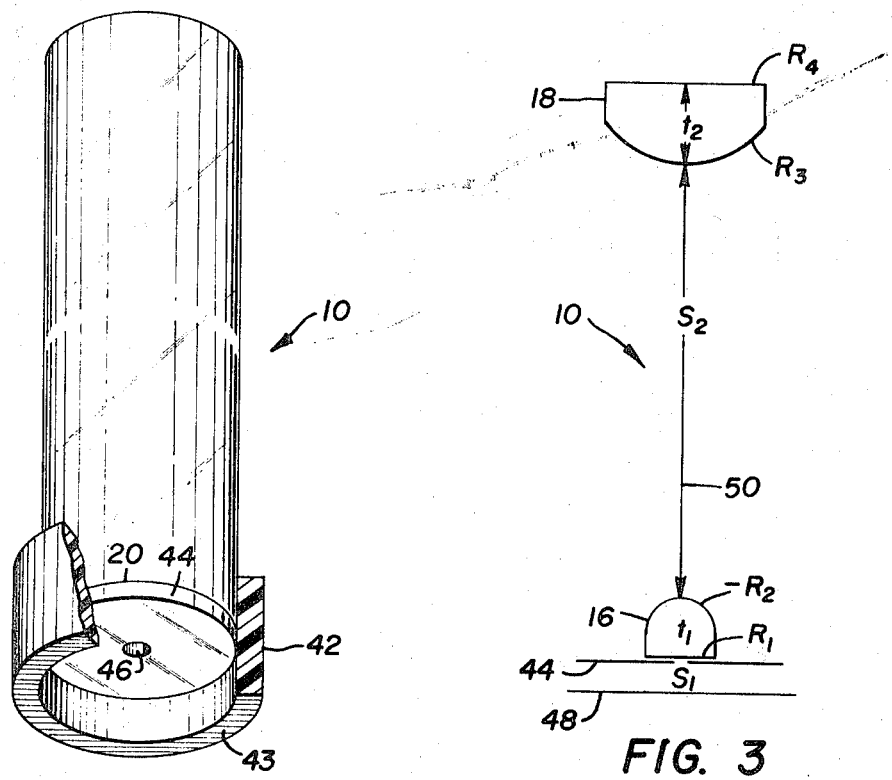
FIG. 2
FIG. 3
HAROLD  W.  STRAAT
INVENTOR.
BY
AGENT

United States Patent Office 3,551,021
Patented Dec. 29, 1970

3,551,021
HIGH-POWER MAGNIFIER
Harold W. Straat, Irondequoit, N.Y., assignor to Bausch & Lomb Incorporated, Rochester, N.Y., a corporation of New York
Filed Sept. 19, 1968, Ser. No. 760,763
Int. Cl. G02b 7/02
U.S. Cl. 350—69                    8 Claims

ABSTRACT OF THE DISCLOSURE

A magnifier of approximately 100× magnification has a tubular body made from transparent plastic material. A cooperating lens is integrally molded with the tubular body at each end thereof.

BACKGROUND OF THE INVENTION

This invention is related to high-power magnifiers and is more particularly concerned with such magnifiers which are of low cost and capable of reading high density microfilm reproductions of printed material.

In recent years, there have been developed many processes for recording printed communications in greatly reduced size on film or other substrata. More recently, more advanced processes have evolved where the reduction in size has been significantly greater. Books of several hundred pages, such as the Bible, may now be reproduced on a chip only a few inches square. These microreproductions are often reduced in size by 100 times or more. Such a means may, in the near future, be of great value in libraries and other locations of voluminous, but possibly infrequently used material, due to the great reduction in spatial requirements.

There are, of course, many sophisticated electro-optical systems which can reproduce and enlarge such microprint to legible size. However, the cost of such equipment is high and the portability is low. Hence, to provide a workable system using such material, it is necessary to provide a viewing device, portable in nature, and of very low cost so that interested parties may examine that material at various locations to search out material of interest without requiring continual access to the sophisticated equipment, that such equipment may be reserved for use only when detailed examination is required.

SUMMARY OF THE INVENTION

Accordingly, it is an object of the present invention to provide a magnifier of low cost and high portability for reading such microreproductions.

A second object is to provide such a magnifier which provides approximately 100× magnification.

Another object of the present invention is to provide such a magnifier which may be integrally produced of transparent plastic material.

Briefly, the invention in its broadest aspect is such a high-power magnifier which includes a pair of tubular members each of which has an optical element located at one end. Each of the tubular members and its associated optical element are integrally molded of a transparent material. The tubular members are joined together coaxially at the ends opposite the optical elements to form a viewing tube having an optical element at each end. The pair of optical elements cooperate optically to form a high-power magnification system.

Further objects, advantages, and features of the invention will be apparent in the arrangement and construction of the constituent parts in detail as set forth in the following specification taken together with the accompanying drawing.

DESCRIPTION OF THE DRAWING

In the drawing,
FIG. 1 is a longitudinal sectional view of a high-powered magnifier according to the invention,
FIG. 2 is an isometric view partially cut away of the magnifier showing some additional features of the invention, and
FIG. 3 is a schematic representation of the optical elements in the magnifier shown in FIG. 2.

DETAILED DESCRIPTION OF THE PREFERRED EMBODIMENTS

In describing the following figures, like reference numerals refer to identical parts. Referring to FIG. 1, there is shown a high-power magnifier according to the present invention which is designated generally by reference numeral 10. The magnifier 10 is formed, in the preferred embodiment, of two tubular members 12 and 14. The tubular members 12 and 14 have optical elements 16 and 18 located in the end walls 20 and 22, respectively. Lenses 16 and 18 cooperate optically to form a magnifier of high power.

Elements 16 and 18 are molded integrally with tubular members 12 and 14, respectively. The composite members are molded of a transparent material such as many plastics. In the preferred embodiment, applicant chose a methacrylate ester polymer, marketed under the trade name "Lucite" having a refractive index of 1.49 due to the low cost and ease of molding of this material. Nearly any transparent substance, however, having known optical characteristics may likewise be utilized.

Members 12 and 14 are joined together coaxially at the ends opposite elements 16 and 18 to form a viewing tube having an optical element at each end. In this embodiment, an external shoulder 24 is formed on the free end of member 12 along with an extended cylindrical section 26 which terminates in a radial surface 28. In a similar manner member 14 is provided with an internal shoulder 34 against which surface 28 bears at assembly, an extended cylindrical section 32 which is in contact with section 26 to insure alignment, and radial surface 30 which becomes co-extensive with shoulder 24. The sections may be joined by any suitable means which is well known in the plastics art, such as by an adhesive agent, a force fit, or by heating the area after assembly.

In this embodiment, there is shown a diaphragm means 36 having an aperture 38 therein which is located closely adjacent to the rear surface of element 16 to block stray light rays and improve the image quality. Diaphragm 36 may be mounted in any convenient manner; however, herein the diaphragm 36 is provided with an axially extended cylindrical section 40 which is suitably attached in member 12. Section 40 serves to locate the diaphragm 36 with respect to element 16 and to provide additional bearing surface for retaining the diaphragm in position.

Referring now to FIG. 2, there is shown the magnifier 10 with a positioning attachment 42 partially broken away to show a second suitable location for a diaphragm. It is noted that a diaphragm is not necessary for operation of the magnifier, but serves to optimize the performance thereof. A positioning sleeve 42 is fitted about the magnifier 10 at the objective end 20. Sleeve 42 may be permanently fixed in a suitable location, or may be adjustably attached as by a slide fit or by molded thread means. Sleeve 42 serves to accurately position element 16 with respect to the surface to be examined which is placed against the bottom radial surface 43 of sleeve 42. A diaphragm 44 with aperture 46 is attached to the end wall 20 of magnifier 10.

Referring now to FIG. 3, there is shown an optical diagram of the magnifier as shown in FIG. 2. A plano-convex lens 16 is located a distance $S_1$ from the surface to be magnified 48. Lens 16 has a front surface designated $R_1$, and a rear surface designated $-R_2$ separated from $R_1$ by an axial thickness $t_1$. Located adjacent to surface $R_1$ is diaphragm 44 having an effective aperture of 1.0 millimeter.

Optically aligned with element 16 along optical axis 50 is lens 18 at an axial distance $S_2$ from element 16. Lens 18 is a convexo-plano element having a front surface designated $R_3$, a rear surface designated $R_4$, and an axial thickness $t_2$.

The specific values for the constructional data for the example shown, a magnifier of approximately 100× magnification, are given in the table herebelow. The values are given in millimeters and the minus (—) sign designates that the center of curvature lies on the object side of the surface.

| | |
|---|---|
| $R_1$ | ∞ |
| $-R_2$ | 2.262 |
| $R_3$ | 16.0 |
| $R_4$ | ∞ |
| $S_1$ | 2.596 |
| $S_2$ | 87.37 |
| $t_1$ | 3.6 |
| $t_2$ | 4.5 |

It will be noted that the above data is given as an example only, one skilled in the lens design art may easily derive values for other magnifications and materials. In addition, the optical surfaces might be molded with aspherical contours in order to improve the image quality.

I claim:

1. A compound viewing tube magnifier for reading microreproduction film chips reduced in size by 100 times or more, comprising:
    an objective lens member comprising a one-piece hollow cylindrical tube of optically transparent material having a shoulder at one end and an objective lens at the other end, said objective lens being of plano-convex form with said convex portion inward;
    an eyelens member comprising a one-piece molded hollow cylindrical tube of optically transparent material having a shoulder complementary to that of said objective lens member at one end and an eyelens at the other end, said eyelens being of plano-convex form with said convex portion inward, said eyelens member being rigidly joined with said objective lens member at said shoulders for aligning said eyelens with said objective lens for optical cooperation of said objective lens with said eyelens; and
    a spacing member connected to the exterior of said objective lens member for fixing the object conjugate of said viewing tube magnifier.

2. A high-powered magnifier according to claim 1 wherein one of said optical elements is an objective lens element and the other of said elements is an eyelens element.

3. A high-powered magnifier according to claim 2 wherein diaphragm means is located adjacent to said objective lens element.

4. A high-powered magnifier of essentially 100× magnification comprising;
    a pair of tubular members each having an optical element located at one end thereof, each of the tubular members and its associated optical element being integrally molded of a methacrylate ester polymer having a refractive index of 1.49,
    the tubular members being joined together coaxially at the ends opposite the optical elements to form a viewing tube having an objective lens element at one end and an eyelens element at the other end thereof,
    a diaphragm having an effective aperture of 1.0 located closely adjacent to the object side of the objective lens element,
    the objective lens element being spaced a distance $S_1$ from an object surface, the objective lens element being a plano-convex lens element having a plano surface $R_1$ on the object side, an axial thickness $t_1$, and a convex rear surface having a radius designated $-R_2$,
    the eyelens element being optically aligned with the objective lens element and spaced a distance $S_2$ therefrom, the eyelens element being a convexo-plano element having a convex front surface whose radius is designated $R_3$, an axial thickness $t_2$, and a plano rear surface designated by $R_4$, and
    the specific values relating to the aforementioned designations are given in the table herebelow, wherein a minus (—) sign designates a surface which is concave toward the object surface, all dimensions being given in millimeters,

| | |
|---|---|
| $R_1$ | ∞ |
| $-R_2$ | 2.262 |
| $R_3$ | 16.0 |
| $R_4$ | ∞ |
| $S_1$ | 2.596 |
| $S_2$ | 87.37 |
| $t_1$ | 3.6 |
| $t_2$ | 4.5 |

5. A high-powered magnifier according to claim 2 wherein means is provided for positioning said objective lens element relative to a viewing surface.

6. A high-powered magnifier according to claim 5 in which said positioning means is adjustable.

7. A high-powered magnifier according to claim 3 wherein means is provided for positioning said objective lens element relative to a viewing surface.

8. A high-powered magnifier according to claim 7 in which said positioning means is adjustable.

References Cited

UNITED STATES PATENTS

| | | | |
|---|---|---|---|
| 1,331,093 | 2/1920 | Bold | 350—242 |
| 1,501,504 | 7/1924 | Truax | 350—243UX |
| 1,920,345 | 8/1933 | Biernat | 350—69UX |
| 2,346,002 | 4/1944 | Bennett et al. | 350—252X |
| 2,443,004 | 6/1948 | Horwitz | 350—252X |
| 2,638,810 | 5/1953 | Berleme | 350—252X |

FOREIGN PATENTS

| | | | |
|---|---|---|---|
| 1,136,978 | 9/1960 | France | 350—243 |
| 2,347 | 1861 | Great Britain. | |

PAUL R. GILLIAM, Primary Examiner